United States Patent

Stanciu

[15] 3,638,673
[45] Feb. 1, 1972

[54] WAX-CONDITIONING APPARATUS

[72] Inventor: Virgil V. Stanciu, Rocky River, Ohio

[73] Assignee: Lampcraft Tool & Mold, Inc., Cleveland, Ohio

[22] Filed: Dec. 23, 1969

[21] Appl. No.: 887,589

[52] U.S. Cl. .................................. 137/205, 18/30, 259/8, 137/334
[51] Int. Cl. ........................................... B29f 1/08
[58] Field of Search .................. 18/30 V; 259/8; 141/59; 137/334, 338, 341, 205

[56] References Cited

UNITED STATES PATENTS

| | | | |
|---|---|---|---|
| 2,548,340 | 4/1951 | Bower | 18/30 V X |
| 2,626,786 | 1/1953 | McGlothlin | 259/8 |
| 2,666,949 | 1/1954 | Slankewich | 18/30 V X |
| 3,123,342 | 3/1964 | Little | 259/8 V |
| 3,253,303 | 5/1966 | Bradt | 18/30 V |

*Primary Examiner*—Alan Cohan
*Attorney*—Baldwin, Egan, Walling & Fetzer

[57] ABSTRACT

A wax-melting and conditioning device comprises an airtight tank of material providing fast heat transfer, heating means for the tank, inwardly extending fins to increase the heat transfer to the wax, outwardly extending fins, if necessary, to cool the wax quickly to suitable injection temperature, means for agitating the wax in the tank and a vacuum pump for deaerating the wax during the melting and curing period. The tank is also equipped with at least one heated flexible hose for direct connection to a hot wax reservoir of a wax-injection machine equipped to transfer the wax from the melting tank to the injection machine reservoir free of air by moving a piston in the reservoir in a manner to suck wax over from the tank.

1 Claims, 6 Drawing Figures

INVENTOR.
VIRGIL V. STANCIU
BY
Baldwin, Egan, Walling & Fetzer
ATTORNEYS

INVENTOR.
VIRGIL V. STANCIU

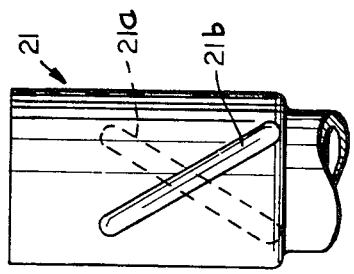
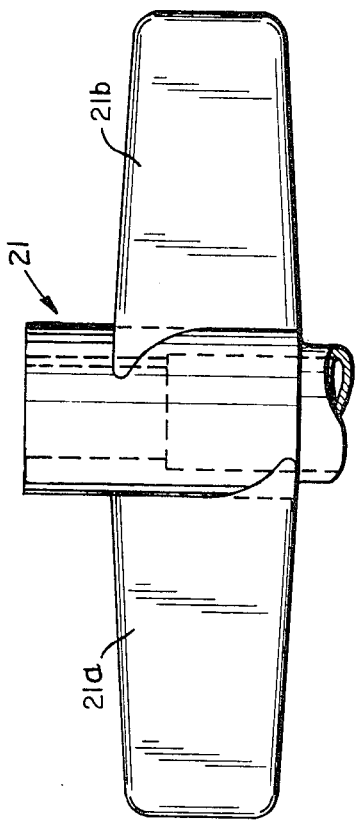
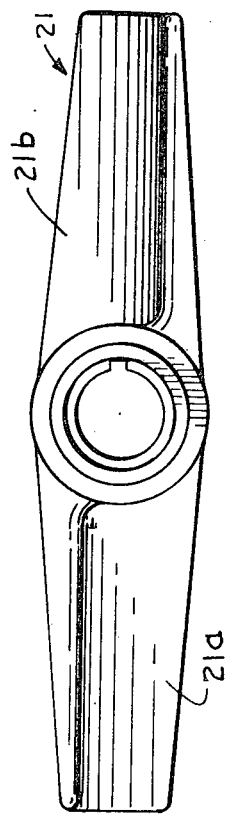

WAX-CONDITIONING APPARATUS

Wax used in injection processes for producing patterns for wax investment casting should be free of air as otherwise patterns will be produced with air bubbles on the surface which will be reproduced in the casting making it unacceptable. Generally, the melting facilities in use today are not conducive to good wax preparation. The melting of the wax is usually accomplished in heated vessels open to the air, thus resulting in aeration and contamination. During the melting process, the wax is commonly agitated by rotary agitators which have the distinct disadvantage of inducing air into the liquid wax. The transfer of the liquid wax from the wax-melting apparatus to the storage reservoir of a wax-injection machine is quite commonly done by use of a bucket which causes further aeration problems when the wax is poured into the bucket and then from the bucket into the injection reservoir. It is an object of this invention to overcome these difficulties and to produce a liquid wax free of air and to transfer the same to the reservoir of a wax-injection machine in that condition.

Other objects and advantages of the present invention will be apparent from the accompanying drawings and description and the essential features thereof will be set forth in the appended claims.

In the drawings,

FIG. 3 is a sectional view, enlarged, taken along the line 3—3 of FIG. 1 showing the construction of the melting tank with the agitator removed; while FIGS. 4, 5 and 6 are respectively an elevational view, a top plan view, and an end elevational view of one of the agitator blades of FIG. 1, enlarged.

Figure 1:
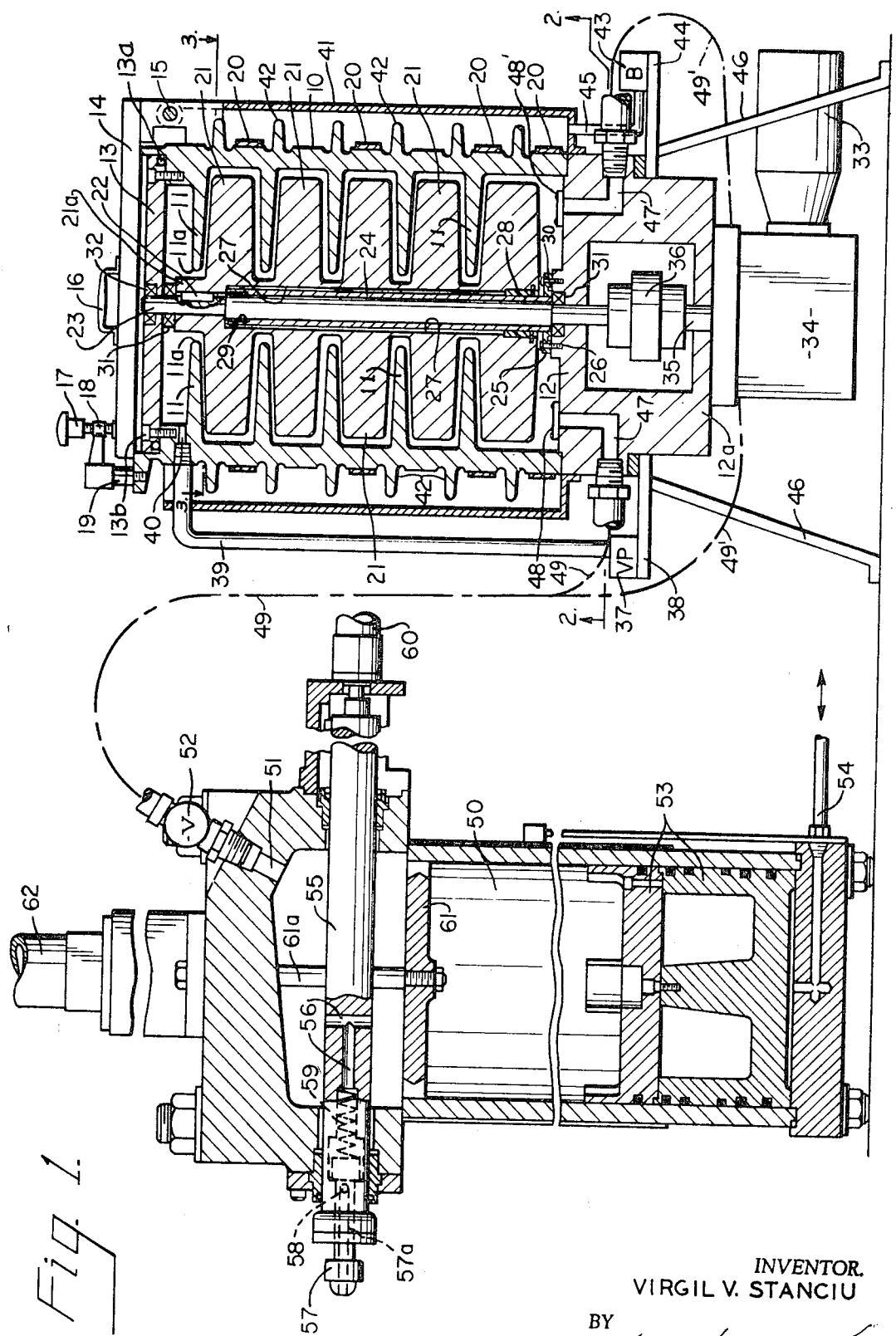
FIG. 1 shows a central sectional view through a wax melter constructed according to this invention, together with a central sectional view through a wax-injection apparatus adapted to transfer the liquid wax from the melter to the injection reservoir without the introduction of any air into the wax.
Figure 2:
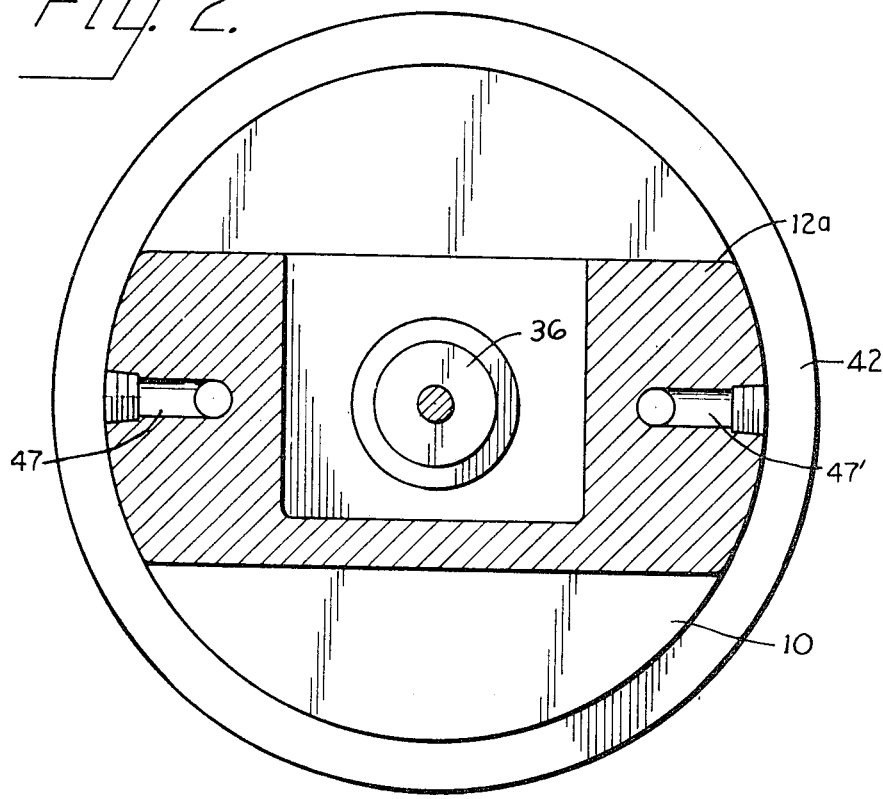
FIG. 2 is a sectional view, enlarged, taken along the line 2—2 of FIG. 1.
Figure 3:
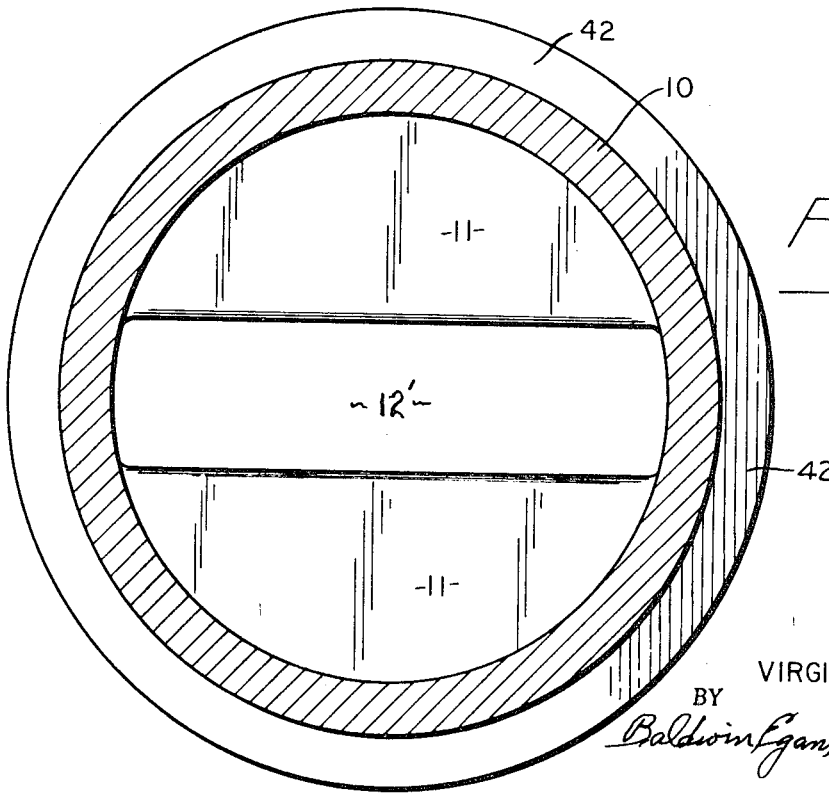

At the right-hand side of FIG. 1, there is shown a central sectional view through the wax-conditioning apparatus of this invention. A tank 10 of good heat-transmitting material, for instance, aluminum, is of generally cylindrical shape open at the bottom and top and having integral inwardly extending heating fins 11 which are generally segmental in form as best seen in FIG. 3, extending in horizontally level pairs from diametrically opposite portions of the cylindrical wall of the container 10 generally horizontally inwardly and terminating in parallel edges 11a short of the axis of the tank, these pairs of fins being arranged at spaced levels vertically in the tank, five levels being shown in FIG. 1. At each level of a pair of fins 11, there is a generally rectangular opening 12' in the midportion of the tank as clearly seen in FIG. 3. As will later appear, the paddles of the agitator are aligned vertically along a supporting shaft and the outside dimension of the agitator paddles is such that the supporting shaft with the paddles thereon can be inserted endwise of the tank 10, it being recognized that the top plan view of an agitator paddle in FIG. 5 is on an enlarged scale from the size of the opening 12 seen in FIG. 3. The bottom of the tank is closed in an airtight manner by a bottom casting 12 and the top of the tank is closed by a top plate 13 and door 14 which is mounted on a hinge 15 and manipulated by handle 16. Preferably, the cover is held tightly closed by means of a clamp 17 which is threaded into a bracket 18 which is oscillatable about a vertical post 19. The top plate 13 is sealed by an annular seal 13a and another seal may be interposed between the top cover 14 and the upper edge of the tank 10, if desired.

Suitable means is provided for melting the wax in the tank 10. The means here shown includes a plurality of electrically energized band heaters 20 which fit tightly against the outer wall of the tank 10 and are provided with a source of electrical energy not shown. The usual controls may be provided to hold the temperature at any desired level, but this is not shown here because it has no part in the present invention.

Means is provided for agitating the melted wax in the tank 10 without the introduction of any air into the wax. FIG. 1 shows a unitary casting, preferably aluminum, having five sets of paddles 21. Each paddle has two arms, the portion 21a on one side of the center being inclined in one direction relative to the vertical and the part 21b on the other side of the center being inclined in the opposite direction relative to the vertical. As seen in FIG. 6, the angle of inclination is approximately 30° to the vertical, although it will be recognized that this is not critical. The agitator is keyed at 22 to a vertical shaft 23 which is mounted for rotation concentrically of the tank 10. A shaft support 24 comprises a vertically extending hollow tube welded at its lower end to a flange 25 which is bolted at 26 to the member 12. The support 24 extends through a vertically extending bore 27 in the agitator and a sleeve 28 of nylon or similar material provides a seal between the bore 27 and the support 24. Between the upper end of the support 24 and shaft 23 is a sealing sleeve 29. An O-ring seal 30 is provided between the flange 25 and the member 12 to prevent leakage of any wax downwardly toward the driving parts below. A thrust bearing 31 is provided set into the member 12 and positioned against a suitable shoulder of the shaft 23. Another thrust bearing 32 is provided between the upper end of the agitator and the lower surface of top plate 13. Still another bearing 32 is provided about the upper end of shaft 23 in the top plate 13.

Means for rotating the shaft 23 comprises a motor 33 which through gearing housed in the casing 34 drives vertical shaft 35. Means is provided for mounting the motor and gearing 33, 34 to the underside of the projection 12a of the member 12, but this is not shown here as it forms no part of the present invention. Means, not shown, is provided for energizing the motor 33. A driving connection 36 is provided between shaft 35 and the lower end of shaft 23. The connection 36 is a clutch which will slip upon encountering an overload.

Means is provided for deaerating the wax within the tank 10. This is here shown as comprising a vacuum pump 37 supported on a suitable racket 38 and connected by means of a pipe 39 with a port 40 which opens into the upper portion of tank 10.

It will be understood that the wax when finally melted in the tank 10 is quite often at a temperature higher than that desirable for a wax-injection operation. If it is necessary to cool the wax by the use of external means, an insulating shield 41 is provided surrounding the entire tank 10 and spaced radially outwardly of sets of cooling fins 42, of which six are shown extending radially outwardly from the outer wall of tank 10 and integral therewith. A blower 43 is mounted on a suitable bracket 44 and communicates by pipe 45 with the lower end of the shield 41. Thus, a blast of cool air is pumped upwardly between the shield 41 and the outer tank 10 with its fins 42 and exhausts at the upper end of the shield 41 so as to increase the cooling effect which is transmitted from fins 42 through the metal of the tank and its inwardly directed fins 11 to quickly cool the wax to the desired temperature.

The entire structure shown at the right-hand half of FIG. 1 is supported on a suitable frame 46 adapted to rest on a floor.

One or more outlets for the melted wax are provided at the bottom of the tank 10, two being shown at 47 and 47'. It will be understood that the number of outlets can be any number desired. At each of the outlets 47 and 47' there is provided a filter 48 or 48' to be sure that no contamination passes over to the wax-injection apparatus. Each of these discharge outlets is connected by suitable heated flexible hose indicated at dot-dash lines at 49 and 49' to conduct the melted wax to a wax-injection machine.

The wax-injection machine shown at the left-hand side of FIG. 1 is like that described and claimed in the copending patent application of Virgil V. Stanciu and Jack R. Peshek, Ser. No. 683,210, filed Nov. 15, 1967, now U.S. Pat. No. 3,535,743, granted Oct. 27, 1970, to which further reference may be had if necessary. It is sufficient to state here that the apparatus includes a wax reservoir 50 into which the wax is injected at 51 at the top of the reservoir under control of a valve 52 admitted from either the hose 49 or 49'. For injection purposes, the wax is placed under pressure by a piston 53 which has a sealed fitting in the inner wall of the reservoir 50 at the bottom and is propelled upwardly by pressure fluid entering through line 54. In the upper portion of the reservoir is a wax-injection nozzle 55 which has an opening 56 at all times in communication with the wax in the reservoir 50. The left-hand end of this passageway 56 is closed by a nozzle tip 57 which has an inlet opening 58 which is closed in the position of the parts shown in FIG. 1 and held in that position by a spring 59. When an injection is to take place, the nozzle tip 57 is placed in communication with the gate of a die and power means 60 connected at the right-hand end of the nozzle 55 moves the entire structure, except the tip 57, toward the left which causes the opening 58 to be moved along with the nozzle top 57 toward the right relative to the nozzle 55 until wax can enter through passageway 36 and opening 58 to be ejected through the nozzle tip 57 through a central passageway 57a. The device 61 is an agitator which may be reciprocated vertically by a power means 62.

The operation of this invention should now be readily understood. With the top plate 13 removed and the cover 14 in its open position, loose wax is placed in the tank 10 and the band heaters 20 are energized so that the wax starts to melt quickly because the heat is conducted radially inwardly by a plurality of the segmental fins 11. The motor 33 is energized so as to drive through the connections 34, 35 and 36 the shaft 23 so as to cause rotation of the agitator paddles 21. After the tank 10 is suitably filled with wax, the cover plate 13 is closed and secured by bolts 13b, after which cover 14 is closed and clamped by the screw clamp 17. The vacuum pump 37 is operated to deaerate the wax in tank 10 while the wax is being brought up to temperature and continuously agitated. After the wax is entirely melted, either it is allowed to cool to a suitable temperature for injection or it is aided in this cooling process by running the blower 43 to cause a cooling blast of air inside of the shield 41 which is effective through the fins 42 and fins 11 to cool the wax within the tank 10 to any desired degree. This temperature is read by a suitable instrument immersed in the wax inside tank 10 which is not shown in the drawings. When it is desired to fill the reservoir 50 of the wax-injection apparatus, the piston 53 is in a raised position under the effect of pressure from the source 54 and is in contact with the underside of the agitator 61. Valve 52 is then opened and the hydraulic jack 62 is operated to move the agitator 61 downwardly using the piston rod 61a. This presses the piston 53 downwardly, passageway 54 being open for flow of the pressure fluid away from the area beneath piston 53 at this time. In this manner, the piston 53 causes sufficient suction to induce a flow of the melted wax from tank 10 through 47, 49 and 52—51 into the wax reservoir 50 without the introduction of any air into the wax. When reservoir 50 is sufficiently replenished, valve 52 is again closed.

It results from this invention that the melted wax in tank 10 is free of air and is transmitted to the wax reservoir 50 of the wax-injection apparatus without the addition of any air so that completely deaerated wax is available for injection into the die through the nozzle tip 57.

What is claimed is:

1. In apparatus for preparing and loading wax into a wax-injection reservoir of a wax-injection machine; an airtight reservoir of hollow cylindrical form having a piston snugly fitting the interior wall of said cylindrical form and having means for reciprocating said piston in said reservoir; an airtight wax-melting tank of good heat-transmitting material having a generally cylindrical wall, said tank having an opening for introduction of solid wax and a removable cover for closing said opening in an airtight manner, means in heat-transmitting relationship to portions of said cylindrical wall of said tank for heating wax in said tank, said tank having heating fins in heat-transmitting relationship with said heated portions of said cylindrical wall of said tank and extending radially inwardly therefrom, said heating fins being segmental in form extending in horizontally level pairs from diametrically opposite portions of said cylindrical wall of said tank generally horizontally inwardly and terminating in parallel edges short of the axis of said tank, said pairs of fins being arranged at spaced levels vertically in said tank, air-free means for agitating wax in said tank, said wax-agitating means comprising a shaft extending axially in said tank and having radially outwardly extending paddles rotatable with said shaft, said paddles so constructed and arranged as to travel between said fins, said paddles being of dimensions to pass between said parallel edges of each pair of fins as said shaft is passed axially into said tank, means for rotating said shaft, cooling fins in heat-transmitting relationship with said cylindrical wall of said tank and extending outwardly therefrom, a shield enclosing said tank radially outside of said cooling fins, and means for passing a stream of air between said tank and said shield and over said cooling fins, vacuum-producing means having an inlet communicating with the upper portion of said tank, a heated passageway communicating between the lower portion of said tank and the upper portion of said wax-injection reservoir, and valve means controlling wax flow in said passageway, whereby solid wax may be placed in said tank, said tank may be closed, said wax may be melted inside said tank and kept agitated therein, and cooled if necessary by said cooling fins, substantially all air may be removed from the tank and its contained wax by operation of said vacuum-producing means, said valve means may be opened and said piston may be moved downwardly in said reservoir to cause a negative pressure in the upper portion of said reservoir and thus causing melted wax to flow from said tank through said passageway into said reservoir in an air-free manner, after which said valve may be closed during operation of said wax injection machine.

* * * * *